(12) United States Patent
Smith et al.

(10) Patent No.: US 6,911,069 B2
(45) Date of Patent: *Jun. 28, 2005

(54) STAIN RESISTANT COATING COMPOSITION

(75) Inventors: Kim R. Smith, Woodbury, MN (US); Scott I. DeFields, Oakdale, MN (US); Keith E. Olson, Apple Valley, MN (US)

(73) Assignee: Ecolab Inc., St. Paul, MN (US)

( * ) Notice: Subject to any disclaimer, the term of this patent is extended or adjusted under 35 U.S.C. 154(b) by 165 days.

This patent is subject to a terminal disclaimer.

(21) Appl. No.: 10/293,798

(22) Filed: Nov. 12, 2002

(65) Prior Publication Data

US 2004/0091616 A1 May 13, 2004

(51) Int. Cl.[7] .......................... C09G 1/00; C09G 1/08; C09G 1/16; C09K 3/00
(52) U.S. Cl. .............................. 106/3; 106/10; 106/11; 252/188.1; 252/188.21; 252/188.22; 252/188.23; 524/418; 524/429
(58) Field of Search .............................. 106/3, 10, 11; 252/188.21, 188.22, 188.23, 188.1; 524/418, 429

(56) References Cited

U.S. PATENT DOCUMENTS

| | | | | |
|---|---|---|---|---|
| 2,989,420 A | * | 6/1961 | Zdanowski | 442/148 |
| 3,061,564 A | * | 10/1962 | Zdanowski et al. | 524/599 |
| 3,130,176 A | * | 4/1964 | Zdanowski et al. | 525/227 |
| 3,253,941 A | * | 5/1966 | Finn et al. | 427/155 |
| 3,290,264 A | * | 12/1966 | Baranauckas et al. | 106/10 |
| 3,457,208 A | * | 7/1969 | McCarthy et al. | 524/204 |
| 4,131,585 A | | 12/1978 | Feigin | |
| 4,828,569 A | | 5/1989 | Heath et al. | |
| 5,037,485 A | * | 8/1991 | Chromecek et al. | 134/7 |
| 5,385,604 A | | 1/1995 | Ainslie | |
| 5,428,107 A | * | 6/1995 | Tysak et al. | 525/102 |
| 5,522,580 A | | 6/1996 | Varner, Jr. et al. | |
| 5,669,937 A | | 9/1997 | McBride et al. | |
| 5,723,182 A | * | 3/1998 | Choi et al. | 427/389 |
| 5,760,113 A | * | 6/1998 | Mitsutake et al. | 524/161 |
| 6,309,471 B1 | | 10/2001 | Smith et al. | |
| 2003/0065047 A1 | * | 4/2003 | Katou | 522/1 |

OTHER PUBLICATIONS

"Iodine Stains on Hard Surface Floors," [online] Michigan State University Extension, East Lansing, MI [retrieved on Nov. 11, 2002]. Retrieved from the Internet:<URL: http://www.msue.msu.edu/msue/imp/mod02/01500354.html>.

"Removal and Prevention of Betadine and Iodine Stains," [online] The Domco Tarkett Group, Whitehall, PA [retrieved on Nov. 11, 2002]. Retrieved from the Internet: <URL: http://www.tarkettna.com/documents/care_maintanance/remove_prevent_stain .pdf>.

Bertand, Gary L., "Iodine Clock Reaction," [online] Department of Chemistry, University of Missouri, Rolla, MI [retrieved on Nov. 11, 2002]. Retrieved from the Internet: <URL:http://web.umr.edu/~gbert/IClock/discussion.htm>.

Enter, Melissa, "Art Recipes" [online] Child Care Friends, Mankato, MN [retrieved on Nov. 11, 2002]. Retrieved from the Internet: <URL:http://childcarefriends.com/art_recipes.htm>.

Lowinsohn, Denise et al., "Coulometric Titrations in Wine Samples: Studies on the Determination of S(IV) and the Formation of Adducts," Journal of Chemical Education (Oxford, OH) 79(1):103–105 (Jan. 2002).

Mori, Yumiko "Bubbles," The Chemistry Education Journal [published online], Utsunomiya University (Utsunomiya, Japan) [retrieved on Nov. 11, 2002]; vol. 2, Dec. 15, 1994. Retrieved from the Internet: <http://member.nifty.ne.jp/kume/naru/002/naru002e.html>.

Schiff, Nathan "All About Starch," [online] Schiff Consulting, Ontario, Canada [retrieved on Nov. 11, 2002]. Retrieved from the Internet: <URL:http://www.schiff-consulting.com/LAUNDRYSTARCH.htm>.

Yeoman, EC "The History of Iodine and Povidone–Iodine," [online] e–jottings about Tissue Viability, London, England, [retrieved on Nov. 11, 2002]. Retrieved from the Internet: <URL:http://www.greenfingerslandscaping.com/wounds/html/pi.html.

* cited by examiner

Primary Examiner—Joseph D. Anthony
(74) Attorney, Agent, or Firm—IPLM Group, P.A.

(57) ABSTRACT

Iodine or iodophor stain resistance is imparted to a surface by applying a hardenable coating composition containing an effective amount of a reducing agent having a redox potential sufficient to decolorize an iodine or iodophor stain. The reducing agent reacts with triiodide anion in the stain to change the stain coloration from a yellowish hue (e.g., yellow-white, yellow or brown) towards a lighter hue (e.g., pale yellow, white or transparent). This decolorization reaction takes place over a period of minutes, hours or days, and preferably can eventually cause the stain to disappear.

7 Claims, No Drawings

US 6,911,069 B2

STAIN RESISTANT COATING COMPOSITION

TECHNICAL FIELD

This invention relates to coating compositions, stain removal and stain treatment.

BACKGROUND

Products containing iodine or iodophors (complexes of iodine with a suitable carrier) are widely used in hospitals, clinics, nursing homes and other health care facilities. These products can quickly reduce microbial populations on skin, gums, and other tissues or surfaces. Unfortunately, when iodine- or iodophor-containing products are spilled or otherwise unintentionally contact surfaces such as tile floors, they can cause semi-permanent dark yellow or brown stains. These stains can be very difficult to remove using traditional cleaning and laundering techniques, and are especially difficult to remove from floor tiles. For example, when iodophors formed from a complex of iodine and polyvinylpyrrolidone are spilled on vinyl composite tiles coated with a typical floor finish, both the finish and tiles may stain. Removal of such stains may require recoating the floor or even replacing the stained tiles. This can require substantial time and expenditure.

U.S. Pat. No. 5,385,604 describes a germicide-resistant floor polish. U.S. Pat. Nos. 4,828,569, 5,522,580, 5,669,937, 6,309,471 describe various cleaners for iodine or iodophor stains. Iodine or iodophor stains can also be removed by scrubbing the stain with a paste or solution of sodium thiosulfate.

Iodine and iodophor stains indicate that spillage or other mistakes may have taken place, are highly visible, and may remind viewers of blood or other bodily fluids. Accordingly, such stains are very undesirable in a health care facility.

SUMMARY OF THE INVENTION

The present invention provides, in one aspect, a method for imparting iodine or iodophor stain resistance to a surface comprising applying to the surface a hardenable coating composition comprising an effective amount of a reducing agent having a redox potential sufficient to decolorize an iodine or iodophor stain.

In another aspect the invention provides a method for imparting to a surface resistance to reducible stains comprising applying to the surface a hardenable coating composition comprising an effective amount of a reducing agent having a redox potential sufficient to decolorize a reducible stain.

In another aspect the invention provides a coating composition comprising a hardenable film-former and an effective amount of a reducing agent having a redox potential sufficient to decolorize an iodine or iodophor stain on the film-former.

In yet another aspect, the invention provides a floor coated with a floor finish comprising an effective amount of a reducing agent having a redox potential sufficient to decolorize an iodine or iodophor stain on the floor finish.

The reducing agent reacts with triiodide anion in the stain to change the stain coloration from a yellowish hue (e.g., yellow-white, yellow or brown) towards a lighter hue (e.g., pale yellow, white or transparent). This decolorization reaction takes place over a period of minutes, hours or days, and preferably can eventually cause the stain to disappear.

DETAILED DESCRIPTION

In this application, iodine and iodophor will (unless the context requires otherwise) collectively be referred to as "iodine".

In this application, a "hardenable" coating composition is a composition that can be applied to a surface and then dried, cured, polymerized or otherwise converted to form a durable coating on the surface.

In this application, an "effective amount" of a reducing agent is an amount sufficient to at least partially decolorize an iodine stain when applied to a test stain and allowed to stand for one hour at room temperature. A suitable test stain can be formed by applying an aqueous 5 weight percent povidone-iodine solution to white vinyl composite tiles coated with a metal-catalyzed acrylic floor finish and wiping away excess povidone-iodine solution. Decolorization can be evaluated by visual observation of the stain under average overhead fluorescent illumination.

The invention can be used to prevent or decolorize stains caused by a wide variety of iodine-containing products. Typical iodine-containing products include tincture of iodine and Lugol's solution. The invention has particular utility for stains caused by iodophor-containing products. Iodophors are complexes of iodine with polymers such as polyvinyl pyrrolidone or polyethylene glycol, or complexes of iodine with a suitable surfactant. Iodine complexes with polyvinylpyrrolidone are especially widely-used and are generally known as povidone-iodine. Suitable commercially available povidone-iodine products include ALPHADINE™ solution, ointment, powder and scrub foam (all commercially available from Ecolab Inc.) and BETADINE™ antibiotics and microbicides (all commercially available from Purdue Pharma LP).

The invention can also be used to mask other problematic reducible stains that may be encountered, particularly those arising from the use of colored dyes in laboratories and certain food soils in cafeterias.

A variety of reducing agents can be employed in the invention. Preferred reducing agents have redox potentials that range from +0.558 to -4.00 volts for the oxidative half-reaction at 25° C., using redox potentials such as those shown in, e.g., *Lange's Handbook of Chemistry*, 12th edition, pages 6-2 through 6-21, McGraw Hill (1979). Particularly preferred reducing agents include sulfites, hydrosulfites, nitrites, hydronitrites, phosphites and hydrophosphites, with sulfites being most preferred. An effective amount of reducing agent should be employed. Such effective amount will depend in part on the chosen reducing agent. For sulfites an effective amount is greater than 0.2 weight percent of the coating composition. A preferred amount of reducing agent is about 1 to about 10 weight percent, more preferably about 1 to about 4 weight percent and most preferably about 1 to about 3 weight percent.

A variety of hardenable coating compositions can be employed in the invention. Such compositions can be made from a wide variety of film formers. Floor finish compositions are especially preferred coating compositions for use in the invention. Suitable commercially available floor finish compositions that can be modified by addition of the reducing agent include PADLOCK™, GEMSTAR LASER™ and TAJ MAHAL™ acrylic floor finishes from Ecolab Inc.; CORNERSTONE™ and TOPLINE™ acrylic floor finishes from 3M; HIGH NOON™ acrylic finish from Butchers; CITATION™ acrylic finish from Buckeye International, Inc., COMPLETE™, SIGNATURE™, TECHNIQUE™ and VECTRA™ acrylic floor finishes from SC Johnson Professional Products; SPLENDOR™, DECADE 90™, PRIME SHINE™ ULTRA and PREMIER™ acrylic finishes and FORTRESS™ urethane acrylic finish from Minuteman, International, Inc.; UPPER LIMITS™ acrylic finish from Spartan Chemical Co.; blends of ROSHIELD™ acrylate coating with styrene maleic anhydride polymer as described in PCT Published patent application Ser. No. 98/11,168; COURTMASTER II™ urethane floor finish from Ecolab Inc.; strippable floor coatings designated as "sealers" (e.g., OVER AND UNDER™ floor sealer, available from S. C. Johnson Professional Products and ACRYL-KOTE™ Seal and Finish and PREP Floor Seal from Minuteman, International, Inc.); strippable coatings based on polyvinylacetates and materials such as those described in U.S. Pat. Nos. 4,517,330 and 5,319,018 and the patents cited therein. The coating can also be a UV-curable coating such as described in copending application Ser. No. 10/231,367 entitled HIGHLY DURABLE WATERBORNE RADIATION CURED COATING, filed Aug. 27, 2002 and incorporated herein by reference in its entirety. Blends of coatings (e.g., up to 50 weight percent of a radiation curable coating with less than 50 weight percent of a non-radiation curable coating) can also be employed in the invention.

The reducing agent may be incorporated into the coating composition at any stage in manufacturing. The reducing agent may be added as a solid, powder, crystalline material, agglomerate, or solution. Solvents (e.g., glycol ethers, alcohols, water and the like), pH modifiers (e.g., caustics, etc) or hydrotropes (e.g., sodium xylene sulfonate, potassium cumene sulfonate, octyldimethylamine oxide, monoethanolamine, diethanolamine, triethanolamine, ammonia or ammonium salts and the like) may be added if desired to assist in solubilizing the reducing agent.

The coating composition can contain a variety of adjuvants to alter the performance or properties of the coating composition before or after application to a substrate. Useful adjuvants include inorganic particles as described in copending U.S. patent application Ser. No. 09/657,420 filed Sep. 8, 2000 and entitled SCRATCH-RESISTANT STRIPPABLE FINISH, the disclosure of which is incorporated herein by reference. Other useful adjuvants include surfactants, defoamers, waxes, indicators, colorants, optical brighteners, UV absorbers, light stabilizers and antioxidants. The types and amounts of such adjuvants will be apparent to those skilled in the art.

Starch can also be incorporated into the coating composition, as further described in copending U.S. Pat. No. 6,756,349 B2 entitled MASKING AGENT FOR IODINE STAINS, filed Nov. 12, 2002 and incorporated herein by reference in its entirety. Suitable starch can be obtained from a variety of sources such as rice, wheat, corn, potatoes, and the like. Depending in part on factors such as the molecular weight of the starch from such source and upon the desired degree of solubility, the starch can be used as is or hydrolyzed or emulsified as desired. Hydrolysis can be conveniently be accomplished by cooking the starch under appropriate conditions, using for example a pressure vessel and temperatures of about 100 to about 130° C. The starch can also be hydrolyzed using other techniques that will be familiar to those skilled in the art, for example by using a suitable enzyme. The starch may be added as a solid, powder, crystalline material, agglomerate, or solution. If necessary, solvents or hydrotropes (e.g., those mentioned above in connection with the reducing agent) may be added to assist in solubilizing or emulsifying the starch.

The compositions of the invention can also include product packaging for one-part or two-part forms of the product, instructions for use, and a suitable applicator. Such packaging can be in the form of a power pack for addition to an existing product, e.g., a floor cleaning product.

The compositions of the invention can be applied to a variety of stainable surfaces including floors (e.g., in hospitals, clinics, nursing homes, doctors' offices, dentists' offices, veterinarians' offices, milking parlors and the like), non-floor architectural surfaces (e.g., walls, ceilings, countertops, cabinets and the like) and ambulance interiors. The compositions of the invention are recommended whenever procedures such as surgical scrubs, skin preparation, teat dips, and other activities involving iodine-containing products are performed.

The compositions of the invention can be applied and removed using a variety of methods and devices that will be familiar to those skilled in the art. For example, such compositions may be applied using techniques such as mopping (e.g., with flat or conventional mops), spraying, wiping, autoscrubbing (e.g., using combination equipment for carrying out mechanical floor cleaning and other functions such as mechanical floor cleaning/coating or coating/burnishing equipment) or flood coating. Mop application is preferred for coating floors. Typically, the substrate should first be cleaned and any loose debris removed. One or more coats of the coating composition (e.g., one to five coats) are applied to the substrate, and allowed to dry. Each coat preferably will have a dry coating thickness of about 0.1 to about 100 micrometers, more preferably about 2.5 to about 20 micrometers. Preferably the overall coating thickness will be about 5 to about 150 micrometers, more preferably about 5 to about 40 micrometers.

The surface of the hardened coating composition may be renewed using techniques such as buffing/burnishing, cleaning, or by applying a suitable restorer, e.g., a floor finish restorer. When stained by an iodine-containing product, excess iodine-containing product preferably is manually removed (e.g., by wiping). Decolorization of any remaining stain will take place over the course of the next few minutes, hours or days. A longer period of time typically may be required if the coating composition has already been subjected to several stain-decolorization cycles. During decolorization the stain can be masked by applying to the stain a composition containing starch, as described in the above-mentioned U.S. Pat. No. 6,756,349 B2. Such masking causes a change in stain coloration from a yellowish hue towards a bluer hue. For a normal viewer, the thus-masked stain typically will be much less objectionable than the original stain. This will be so even if masking makes the stain dark blue, because the shift to a bluer coloration will also be perceived as making the stained surface cleaner.

The invention is further illustrated in the following non-limiting examples, in which all parts and percentages are by weight unless otherwise indicated.

EXAMPLE 1

Modifying a Conventional Finish

A conventional floor finish (TAJ MAHAL™ floor finish, commercially available from Ecolab, Inc.) was modified by adding 2% sodium sulfite. A vinyl composite floor tile was divided in half. One half was coated 4 times with the unmodified floor finish. The other half was coated 4 times with the modified floor finish containing sodium sulfite. The tile was next treated on each half with a 5% solution of povidone-iodine. A prominent dark yellow stain appeared. After about 1–2 minutes, the stain on the modified floor finish turned from dark brown to colorless. The entire tile was then rinsed with tap water. The modified floor finish remained free of color and the unmodified floor finish continued to exhibit a dark yellow stain. No film damage was noted in the modified floor finish after rinsing. This demonstrates that the composition of this invention can be effective for quickly decolorizing and preventing stains without apparent film damage.

EXAMPLE 2

Modifying a Topcoat

Three coats of a conventional floor finish (GEMSTAR LASER™, commercially available from Ecolab, Inc.) were applied to a vinyl composite floor tile. The tile was then divided into halves. One half was topcoated with a single coat of the same floor finish, and the other half was coated with a single coat of the floor finish modified by the addition of 2% sodium sulfite. Both halves of the coated tile were treated with a 5% solution of povidone-iodine. A prominent dark yellow stain appeared. After about 1–2 minutes, the stain on the modified topcoat portion of the tile turned from dark brown to colorless. The entire tile was then rinsed with tap water. The modified topcoat portion remained free of color and the unmodified topcoat portion continued to exhibit a dark yellow stain. No film damage was noted in the modified topcoat after rinsing. This demonstrates that when used as a topcoat over a conventional coating composition, a composition of this invention can quickly decolorize and prevent stains without apparent film damage.

EXAMPLE 3

Delayed Rinsing of Povidone-iodine Spill

Example 1 was repeated but excess povidone-iodine was not removed and the rinsing step was delayed so that the stained tile could stand undisturbed overnight. The next day the stained portion of the unmodified finish had darkened to a yellow-brown hue. The stained portion of the modified finish had lightened to a pale yellow hue. A brief water rinse removed any visible evidence of color from the modified finish without the occurrence of film damage. The unmodified portion of the tile remained dark yellow-brown after rinsing. This demonstrates that a composition of the invention can be effective at decolorizing and preventing stains even when a spill is allowed to remain on a coating for an extended period of time prior to rinsing.

COMPARATIVE EXAMPLE 1

Using Less than an Effective Amount of Reducing Agent

U.S. Pat. No. 4,131,585 says that up to 0.2% of hydrazine, hydrazides, sodium sulfite or bisulfite can be added to a floor polish as a peroxide inhibitor. Using the method of Example 1, TAJ MAHAL™ floor finish was modified by adding 0.2% sodium sulfite, applied to a tile as in Example 1, coated with 5% povidone-iodine solution and allowed to stand at room temperature. A prominent dark yellow stain appeared. The stain did not visibly decolorize within the next hour.

Various modifications and alterations of this invention will be apparent to those skilled in the art without departing from the scope and spirit of this invention. It should be understood that this invention is not limited to the illustrative embodiments set forth above.

We claim:

1. A coating composition comprising a hardenable film-former and an effective amount of a reducing agent having a redox potential sufficient to decolorize an iodine or iodophor stain on the film-former, wherein the reducing agent comprises a sulfite, hydrosulfite, nitrite, hydronitrite or hydrophospite and will at least partially decolorize a stain caused by the iodine complexed with polyvinylpyrrolidone when applied to the stain, allowed to stand for one hour at room temperature, and evaluated by visual observation of the stain under average overhead fluorescent illumination.

2. A composition according to claim 1 wherein the reducing agent will at least partially decolorize a plurality of stain applications on the same region of the surface.

3. A composition according to claim 1 wherein the reducing agent has a redox potential from +0.558 to −4.00 volts at 25° C.

4. A composition according to claim 1 wherein the reducing agent comprises a sulfite.

5. A composition according to claim 1 comprising about 1 to about 10 weight percent reducing agent.

6. A composition according to claim 1 comprising about 1 to about 4 weight percent reducing agent.

7. A coating composition according to claim 1 wherein the film-former forms a hardened film resistant to rinsing with tap water.

* * * * *

UNITED STATES PATENT AND TRADEMARK OFFICE
CERTIFICATE OF CORRECTION

PATENT NO. : 6,911,069 B2
DATED : June 28, 2005
INVENTOR(S) : Kim R. Smith, Scott I. DeFields and Keith E. Olson It is certified that error appears in the above-identified patent and that said Letters Patent is hereby corrected as shown below:

Column 5,
Line 35, delete "Delayed Rinsing of Povidone-iodine Spill" should read
-- Delayed Rinsing of Povidone-Iodine Spill --.

Column 6,
Line 26, "hydrophospite" should read -- hydrophosphite --.

Signed and Sealed this

Twenty-fifth Day of October, 2005

JON W. DUDAS
*Director of the United States Patent and Trademark Office*